United States Patent [19]
Mundlos et al.

[11] 3,713,770
[45] Jan. 30, 1973

[54] PROCESS FOR THE DYEING OR PRINTING OF TEXTILE MATERIALS MADE FROM POLYMERS OR COPOLYMERS OF ACRYLONITRILE

[75] Inventors: Eberhard Mundlos, Heusenstamm; Reinhard Mohr; Konrad Lohe, both of Offenbach/Main, Germany

[73] Assignee: Farbwerke Hoechst Aktiengesellschaft vormals Meister Lucius & Bruning, Frankfurt/Main, Germany

[22] Filed: Jan. 20, 1971

[21] Appl. No.: 108,220

[30] Foreign Application Priority Data

Jan. 23, 1970  Germany.....................P 20 02 916.7

[52] U.S. Cl.................................8/177 AB, 260/336
[51] Int. Cl..............................................D06p 3/70
[58] Field of Search ..........................8/177, 177 AB

[56] References Cited

FOREIGN PATENTS OR APPLICATIONS

| | | |
|---|---|---|
| 528,351 | 3/1957 | Belgium..........................8/177 AB |
| 535,419 | 1/1957 | Canada............................8/177 AB |
| 1,290,914 | 3/1969 | Germany.........................8/177 AB |
| 85,885 | 3/1896 | Germany |
| 96,668 | 3/1898 | Germany |
| 139,727 | 3/1903 | Germany |

Primary Examiner—George F. Lesmes
Assistant Examiner—T. J. Herbert, Jr.
Attorney—Connolly & Hutz

[57] ABSTRACT

Process for the dyeing and printing of textile materials made from polymers or copolymers of acrylonitrile by using dyestuffs of the general formula

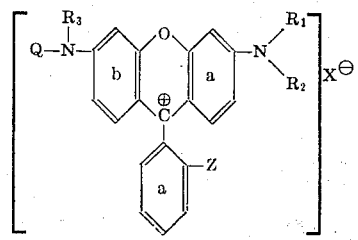

wherein $R_1$, $R_2$, and $R_3$ each stands for a hydrogen atom or an optionally substituted lower alkyl group, Z represents a carboxylic ester group, Q stands for an aromatic or heterocyclic radical bound or not bound to the benzene nucleus $b$, X represents an anion, and wherein each benzene nucleus $a$ or $b$ or the radical Q may optionally be substituted by non-ionic substituents, and which dyeings and prints show very clear and brilliant shades and have good fastness properties.

7 Claims, No Drawings

PROCESS FOR THE DYEING OR PRINTING OF TEXTILE MATERIALS MADE FROM POLYMERS OR COPOLYMERS OF ACRYLONITRILE

The present invention relates to a process for the dyeing and printing of textile materials made from polymers or copolymers of acrylonitrile. In particular, it has been found that textile materials made from polymers or copolymers of acrylonitrile can be dyed and printed in fast shades when using dyestuffs of the general formula

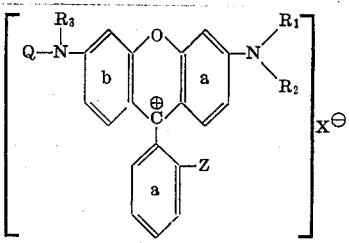

I wherein $R_1$, $R_2$ and $R_3$, being identical or different each represents a hydrogen atom or a lower alkyl group which may be substituted, Z stands for a carboxylic acid ester group, wherein the alkanol component preferably contains one to four carbon atoms, Q stands for an aromatic or heterocyclic radical which may be bound to the benzene nucleus $b$, $X^\ominus$ represents an anion, and wherein the benzene nuclei $a$ and $b$ as well as the radical Q may be further substituted by one or more non-ionic substituents.

The dyestuffs used in the process according to the present invention may be prepared by known methods, for example by condensing phthalic anhydride with a m-amino-phenol of the general formula II

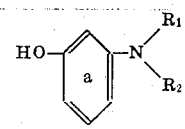

II wherein $R_1$, $R_2$ and $a$ have the meanings given above, subsequently condensing the intermediate so obtained with a compound of the general formula III

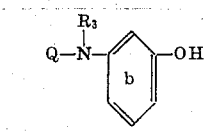

III wherein $R_3$, Q and $b$ have the meanings given above and esterifying the carboxylic acid group in the final reaction product.

Further possibilities for preparing the dyestuffs used according to the invention consist in reacting a compound of the general formula IV

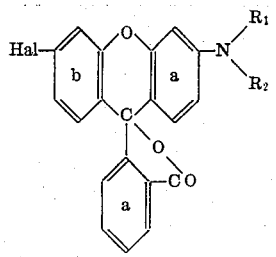

(IV)

wherein Hal represents a halogen atom and $R_1$, $R_2$, $a$ and $b$ have the above meaning, with an amine of the general formula V $$Q - NH - R_3 \qquad \text{V}$$

wherein Q and $R_3$ have the meanings given above, subsequently esterifying the carboxylic acid group, or in condensing phthalic anhydride with a compound of the general formula III, subsequently condensing with a m-aminophenol of the general formula II and esterifying the carboxylic acid group.

Some of the dyestuffs used in the process of the present invention or preliminary products thereof are described in the French Pat. specification No. 295,472 and in the German Pat. specification Nos. 85,885, 96,668 and 139,727. The dyestuffs not yet described may be prepared by analogous methods.

The radical Q may be an aromatic radical, for example a benzene or naphthalene radical which may be fused with or bound to heterocyclic rings. Moreover, Q may also represent a heterocyclic ring system, for example a benzene, naphthalene, indole, benzthiazole, diphenylene oxide, quinoline, indazole or a benzimidazole radical, or the radical Q may be linked with the benzene radical $b$, forming a heterocyclic ring with $b$. The radical Q may furthermore contain non-ionic substituents like the benzene nuclei $a$ and $b$.

As non-ionic substituents in the benzene nuclei $a$ and $b$ and in the radical Q there are considered for example halogen atoms, amino groups, mono- or dialkylamino, arylamino, alkyl, alkoxy, aralkyl, aralkoxy, aryl, aryloxy, arylazo, carboxylic ester groups or optionally substituted carboxylic acid amide, cyano, nitro, hydroxy, trifluoromethyl, alkylsulfonyl, arylsulfonyl, acyloxy, acylamino, alkylsulfonylamino or arylsulfonylamino groups.

The anion X may be any desired simple or complex organic or inorganic anion, for example a radical of the sulfuric acid or semi-esters thereof, of an arylsulfonic acid, of a hydrohalic acid or of another acid, for example of the phosphoric, the acetic, oxalic, tartaric or of the lactic acid, or a chlorozincate radical.

The dyeing is carried out by treating the textile material in a neutral or acidic liquor, preferably in a liquor containing acetic acid or a mineral acid, if desired, in the presence of auxiliaries, and finishing the so-obtained dyeings in the usual manner. The material to be dyed is generally introduced into the dyebath at about 40° to 60° C and dyed at boiling temperature. Dyeing may also be carried out at a pressure above atmospheric pressure, above 100°C.

For the printing of textile material made from polyacrylonitrile or its copolymers, the dyestuffs are applied together with the usual thickeners and optionally printing auxiliaries and fixed in the usual manner by steaming.

As textile materials there are considered fibers, threads, flocks or woven and knitted fabrics made from polymers of acrylonitrile or from copolymers of acrylonitrile with one or more other vinyl compounds, for example vinyl chloride, vinyl fluoride, vinylidene chloride, vinyl acetate, vinyl propionate, vinyl pyridine, vinyl imidazole, vinyl pyrrolidone, vinyl alcohol, acrylic or methacrylic acid esters or acrylic amides.

The dyeings and prints obtained with the dyestuffs used in the process according to the present invention are very clear and often very brilliant and have a good fastness to light, to wet processing, washing, perspiration, carbonizing, decatizing, steaming, ironing, rubbing and to solvents for dry cleaning.

The following Examples illustrate the invention.

EXAMPLE 1

100 g of a pre-cleaned polyacrylonitrile staple fiber yarn were introduced into a dyebath heated to about 60° C, which contained 1 g of crystallized sodium acetate and 5 g of calcined sodium sulfate in 3 liters of water; the liquor was allowed to circulate for about 10 minutes and then, at 60° C, a solution of 1 g of the dyestuff having the formula

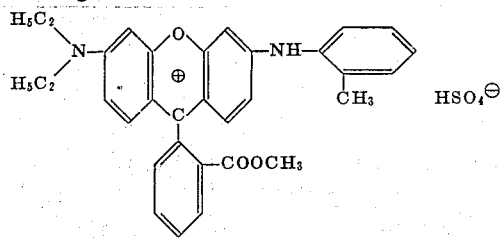

and 3 cc. of a 60 percent acetic acid in 1 liter of water was added. Subsequently, the bath temperature was raised relatively quickly up to 85° C, then slowly to 100° C, in the latter operation the temperature being increased by 1° C during 3 to 4 minutes. When the boiling temperature was reached, the yarn was dyed for 1 – 1.5 hours, whereupon the bath was nearly completely exhausted. Then the dyebath was cooled to about 70° C, the dyed goods were rinsed hot and cold and dried.

A clear bluish violet dyeing was obtained having very good fastnesses to light and wet processing.

EXAMPLE 2

5 g of the dyestuff of the formula

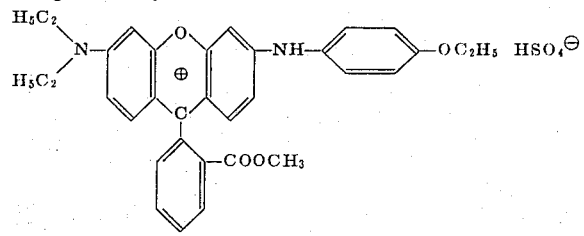

were stirred with 15 cc. of a 60 percent acetic acid to a paste and dissolved in 1 liter of boiling water. This solution was poured into a dyebath which contained, in 5 liter of water heated to 60° C, 1.2 g of a dispersing agent of the alkylaryl polyglycol ether type, 5 g of crystallized sodium acetate and 50 g of anhydrous sodium sulfate.

Subsequently a cross-wound bobbin consisting of 500 g of a pre-cleaned staple fiber yarn made from polyacrylonitrile was introduced into the dyebath, the temperature was raised to 85° C at alternating circulation of liquor and then slowly up to 100° C. The direction of liquor being alternating dyeing was effected for 1 – 1 ½ hours, whereupon the bath was exhausted. Subsequently the bath was cooled to about 70° C, the dyed material was rinsed hot and cold and dried.

A clear bluish violet dyeing was obtained exhibiting very good fastnesses to light and wet processing.

EXAMPLE 3

20 g of the dyestuff having the formula

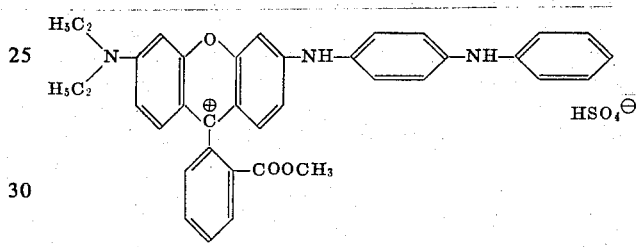

were dissolved hot with 50 g of $\beta,\beta'$-dihydroxy-diethyl sulfide, 30 g of cyclohexanol, 25 g of a 60 percent acetic acid and 425 g of water, and the solution was stirred into 450 g of a crystal gum thickener of a ratio of 1:2.

Polyacrylonitrile fabric was printed with this paste, dried, steamed for ½ hour at 0.2 atmospheres excess pressure and subsequently rinsed. Then the fabric was soaped at 50° C with 1 g of a condensation product of oleic acid and methyltaurine per liter of water, rinsed and dried.

A reddish dark blue print showing very good fastnesses to light and wet processing was obtained.

The following Table lists further dyestuffs which may be used in the process according to the present invention, and the shades obtainable on polyacrylonitrile fibers:

| Dyestuff | | Shade |
|---|---|---|
| (structure with N(C₂H₅)₂, xanthylium, COOCH₃, NH-phenyl) | $HSO_4^\ominus$ | Red violet. |
| (structure with N(C₂H₅)₂, xanthylium, COOCH₃, NH-2,4-dimethylphenyl) | $HSO_4^\ominus$ | Do. |

| Dyestuff | | Shade |
|---|---|---|
| [Rhodamine structure with N(C₂H₅)₂, NH-C₆H₄-Cl (para), COOCH₃] | HSO₄⁻ | Reddish violet. |
| [Rhodamine structure with N(C₂H₅)₂, NH-C₆H₄-CH₃ (meta), COOCH₃] | HSO₄⁻ | Red violet. |
| [Rhodamine structure with N(C₂H₅)₂, NH-C₆H₅, CH₃, COOCH₃] | HSO₄⁻ | Do. |
| [Rhodamine structure with N(C₂H₅)₂, NH-C₆H₃(OCH₃)₂, COOCH₃] | HSO₄⁻ | Bluish violet. |
| [Rhodamine structure with N(C₂H₅)₂, NH-C₆H₂(Cl)₂-NH₂, COOCH₃] | HSO₄⁻ | Blue violet. |
| [Rhodamine structure with N(C₂H₅)₂, NH-benzimidazole-Cl, COOCH₃] | HSO₄⁻ | Bluish bordo. |
| [Rhodamine structure with N(C₂H₅)₂, NH-C₆H₄-CH₃ (para), COOCH₃] | HSO₄⁻ | Red violet. |

| Dyestuff | | Shade |
|---|---|---|
| 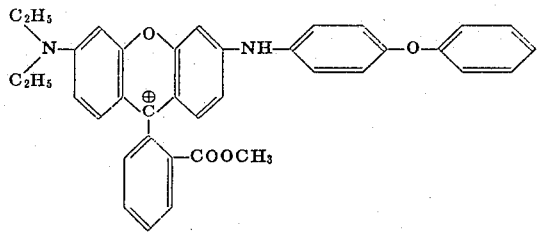 | $HSO_4^\ominus$ | Bluish violet. |
| 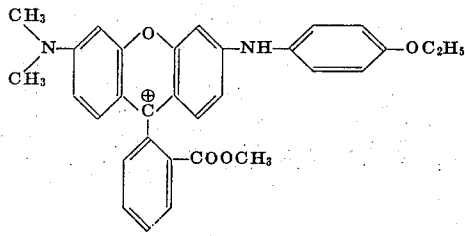 | $HSO_4^\ominus$ | Do. |
| 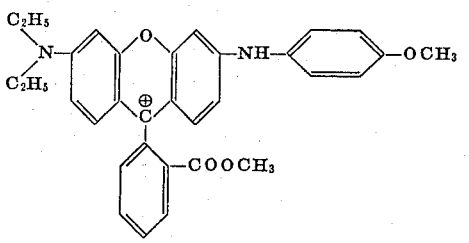 | $\dfrac{ZnCl_4^{\ominus\ominus}}{2}$ | Do. |
| 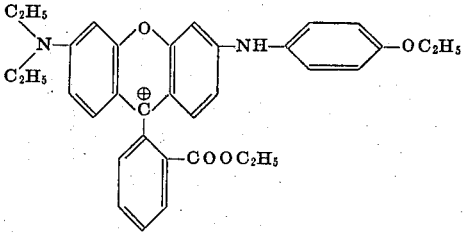 | $\dfrac{ZnCl_4^{\ominus\ominus}}{2}$ | Do. |
| 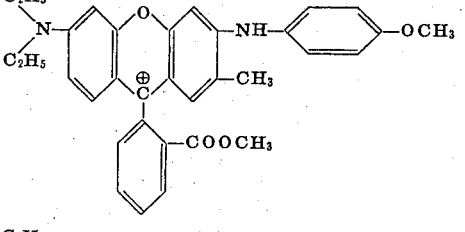 | $\dfrac{ZnCl_4^{\ominus\ominus}}{2}$ | Violet. |
| 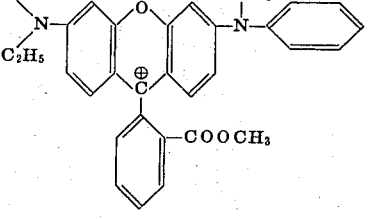 | $\dfrac{ZnCl_4^{\ominus\ominus}}{2}$ | Bluish red. |
| 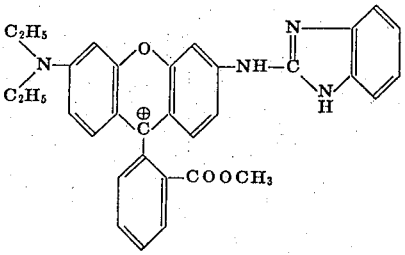 | $HSO_4^\ominus$ | Bluish violet. |

| Dyestuff | | Shade |
|---|---|---|
| 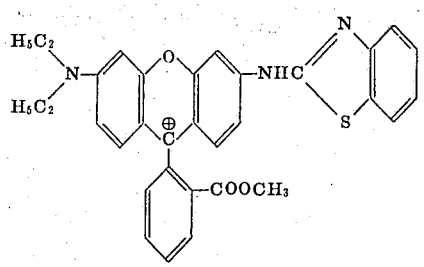 | HSO$_4^\ominus$ | Do. |
| 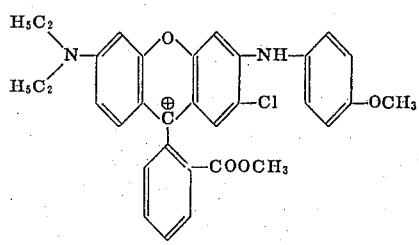 | HSO$_4^\ominus$ | Reddish violet. |
| 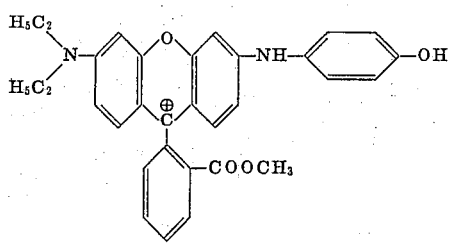 | Cl$^\ominus$ | Red violet. |
| 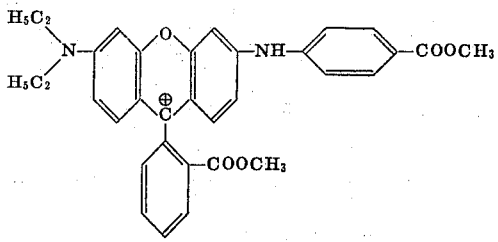 | $\dfrac{\text{ZnCl}_4^{\ominus\ominus}}{2}$ | Bluish red. |
| 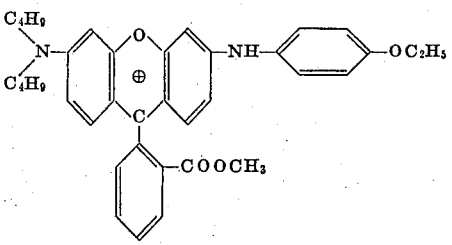 | HSO$_4^\ominus$ | Bluish violet. |
| 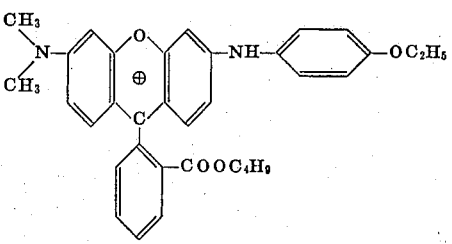 | Cl$^\ominus$ | Do. |
| 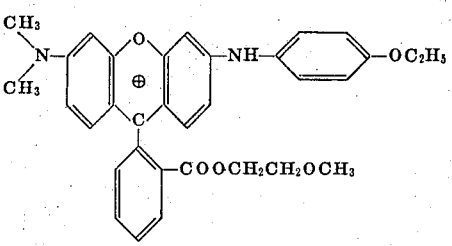 | H$_2$PO$_4^\ominus$ | Do. |

| Dyestuff | | Shade |
|---|---|---|
| 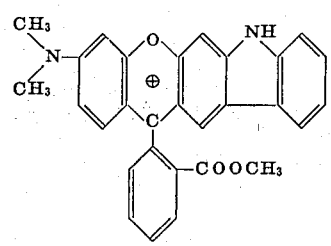 | $HSO_4^\ominus$ | Bluish red. |
| 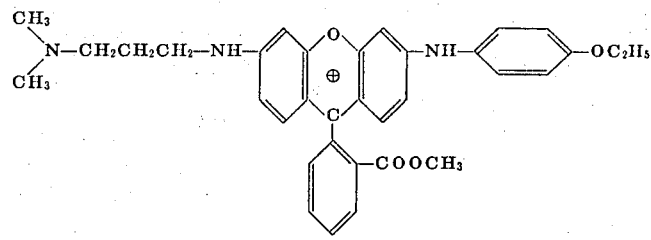 | $HSO_4^\ominus$ | Bluish violet. |
| 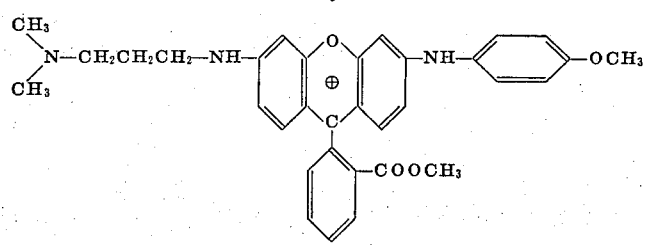 | $Cl^\ominus$ | Do. |

We claim:

1. A process for the dyeing or printing of textile materials made from polymers of acrylonitrile wherein the dyestuffs have the general formula

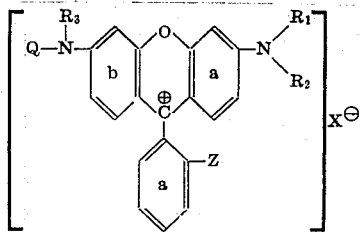

I in which $R_1$, $R_2$ and $R_3$, which may be the same or different each represents a hydrogen atom or a lower alkyl group unsubstituted or substituted, Z represents a carboxylic acid ester group, Q stands for an aromatic or heterocyclic radical bound or not bound to the benzene nucleus b, $X^\ominus$ represents an anion, and wherein one or both of the benzene nuclei a and/or the nucleus b and/or the radical Q are unsubstituted or substituted by one or more hydroxy, amino, alkyl, alkoxy, aryloxy, arylamino, phenyl, carboxylic acid lower alkyl ester radical or halogen atoms.

2. A process as claimed in claim 1, wherein dyestuffs have the general formula I, and $R_1$, $R_2$ and $R_3$ which may be the same or different each represents a hydrogen atom or an alkyl group containing of from one to four carbon atoms, Z represents a carboxylic acid ester group, the alkanol component of which optionally containing an alkoxy group, has from one to four carbon atoms, Q stands for a phenyl, naphthyl, benzthiazolyl, benzimidazolyl, indolyl or for an indazolyl radical which may be condensed to the benzene nucleus b in order to form a N-heterocyclic ring, and which are unsubstituted or substituted by one or two chlorine atoms or by one or two lower alkoxy, lower alkyl, hydroxy, amino, phenoxy, phenylamino or carboxylic acid methyl ester radicals, and $X^\ominus$ represents an anion.

3. A process as claimed in claim 1, wherein said dyestuff has the formula

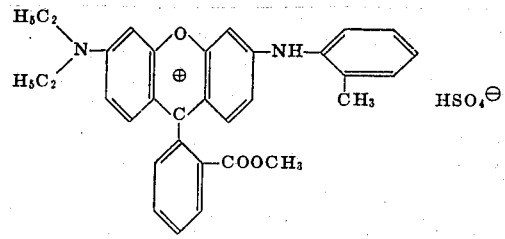

4. A process as claimed in claim 1, wherein said dyestuff has the formula

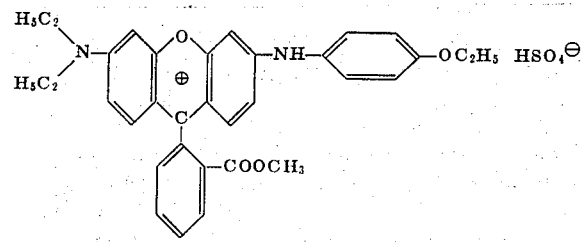

5. A process as claimed in claim 1, wherein said dyestuff has the formula

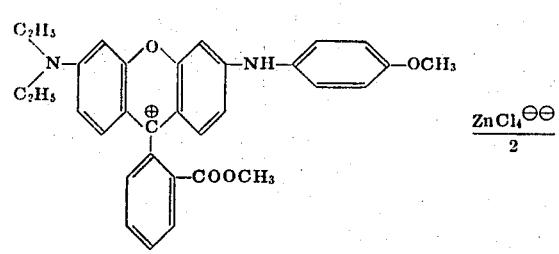

6. A process as claimed in claim 1, wherein said dyestuff has the formula
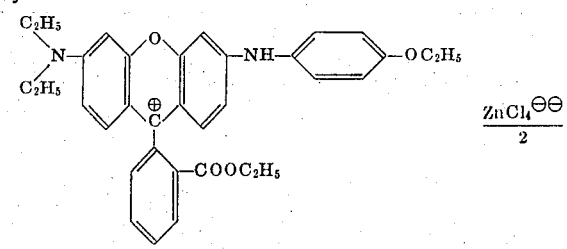
7. A process as claimed in claim 1, wherein said dyestuff has the formula
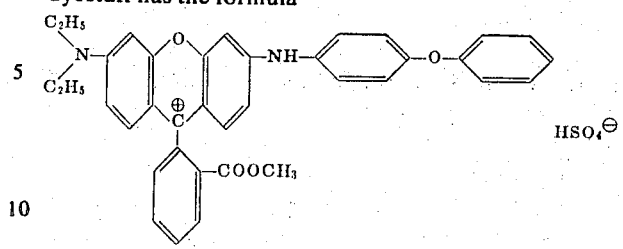
* * * * *